United States Patent Office.

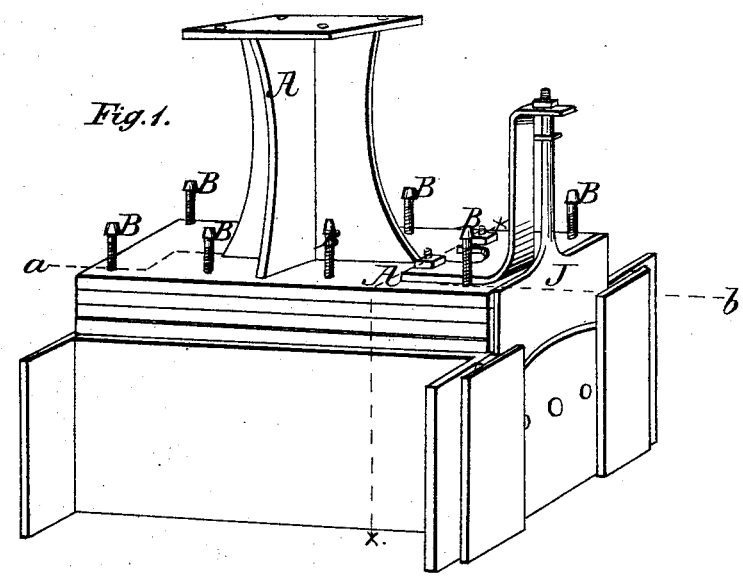

FRANCIS M. FRANKLIN, OLIVER K. McINTIRE, AND WILLIAM WHITELEY, OF SPRINGFIELD, OHIO.

*Letters Patent No. 69,909, dated October 15, 1867.*

IMPROVEMENT IN BRICK-MOULDS.

The Schedule referred to in these Letters Patent and making part of the same.

TO ALL WHOM IT MAY CONCERN:

Be it known that we, FRANCIS M. FRANKLIN, OLIVER K. McINTIRE, and WILLIAM WHITELEY, of Springfield, in the county of Clark, and State of Ohio, have invented a new and useful Improvement in Brick-Moulds to be used by machinery; and we do hereby declare the following to be a full, clear, and exact description of the same, reference being had to the accompanying drawings, in which—

Figure 1 shows a perspective view of our brick-mould, with the plunger partially drawn from it.

Figure 2 is a longitudinal section of the same on line $a\ b$ of fig. 1.

Figure 3 is a vertical cross-section on line $x\ x$ of fig. 1.

In making bricks of suitable clay, it is desirable to make them of mortar of as soft a consistency as will retain their shape, and make them as little porous as may be to press them, so as to be solid or close all the pores; and in making them of suitably soft mortar, they stick to and in the moulds, and come out very rough and imperfect, unless the moulds are well sanded before the mortar is placed therein. This needs to be prevented in order to make good and durable brick rapidly by machinery.

Our invention consists, first, in a system of construction to produce a plunger, to form and deliver bricks without sticking to the mould or plunger, and make them out of clay-mortar, tempered and worked down to a soft consistency, and be pressed, so as not to be left open and porous. This probably cannot be done with a plunger which works loose in the mould, and allows the air and mortar, or any of it, to pass up between the sides of the plunger and the insides of the mould, as the escaping mortar cuts and makes the mould and plunger imperfect and rough, and causes the mortar to stick to them, so as not to deliver the brick, or to do it in a torn and imperfect manner. Our invention is to prevent this by having a mould of sufficient strength to hold the brick in perfect shape whilst being formed and pressed, with the necessary escape places for the surplus mortar that is taken into the mould to insure its being filled, and an adjustable cut-off to shut these escape places in the mould just before the brick is finished, and thus secure the uniform shape and solidity or density of the brick, that would otherwise be smaller and less dense or solid at the end where the mortar escapes, and in constructing the plunger to work air-tight in the mould by means of a double adjustable packing in two layers, one attached to the bottom plate of the plunger, and the other to the upper part of the plunger, and each held by a rim-plate in its position around projecting centres, said rim or supporting plates being held in position by these projecting centres and the set-screws that pass through one part of the plunger and plates and rest against the other in the top and bottom parts of the plunger, and are held in their relative position from separating from each other by means of bolts connecting them together and sustaining them against the pressure of the set-screws whilst forcing the packing-plates against the packing, so as to keep the mould air-tight; also by these and the set-screws, the upper and lower parts of the plunger and their packings are separated and held at such a distance from each other as to leave a space between their inner faces to make an oil-chamber, that is supplied by means of an oil-hole down through the top part of the plunger into this space. The packing working air-tight above and below, against the sides of the mould, carries the oil up and down the entire thickness of the brick in its formation and delivery from the mould. The compressed air between the bottom of the plunger and top of the brick, loosens it from its connection, and allows the brick to pass freely from the mould in a smooth, compact, and proper shape. The bottom plate next the brick is to be covered with felt cloth, woollen cloth, gum cloth, or leather, retained in its proper place by being drawn tight over its lower or outer surface and its edges, and turned tightly under the packing on this plate, and tightened in this position by the set-screws against the packing-plate. To the upper part of the plunger there is a cut-off attached, so as to be carried up and down by the motions of the plunger, adjustable, to cut off the escaping mortar and close the mould at will.

A the cast-iron part of the plunger, consisting of the face, made of four right-angled sections, and a top or cap-plate on top to connect to the machine. The bottom or face of the large plate has a coniform projecting centre of about half an inch in height, that covers its face to within about three quarters of an inch of its edges, forming a square rabbet or corner around the edges of this plate that receives the packing and packing-plate, and also the packing and connecting-screws B B, &c. The packing-screws, which are eight in number, and pass down from the upper or fast face of the bottom plate A, half an inch in from the outer edge, and three-eighths of an inch in diameter, and about two and a half inches long, passing down through this plate, and the packing and packing-plate connected to this plate, and resting against the lower packing-plate, and when they are tightened they force the upper and lower packing-plates against the upper and lower packing at the same time, and spread the packing out tight against the sides of the mould, as need requires. C C, &c., the connecting screw-bolts, six in number, placed about one and one quarter inch from each corner and centre, in line from the corners to centre of the plates, pass through the top and bottom plates and hold them at a given distance apart. D the lower or bottom plate, with an elevated centre and edge groove the same as and for the same purpose as the same in the upper one, to wit, receiving and keeping the packing and packing-rim in position on its upper face, and to be the same size of the inside of the brick-mould, less the thickness of the packing material used on its under face and outer edges. The thickness of this plate, independent of its centre, is about one-fourth of an inch, of wrought metal, and receives the lower packing and packing-plate around its centre on its upper face. F is the facing for the under face of the bottom plate next to the brick, and may be made of leather, felt, cloth, or gum, and cut of the proper dimensions and drawn tightly on the said lower face and around the edges of the bottom plate, and turned over into the packing-groove on the top of this plate and under the packing in this groove, and be held tightly there by means of the packing being forced against it. G G is the packing, made of gum, leather, or composition, cut square on the outer edge to fill the mould tight, and a square opening in the centre, the size of the centre projection of the plate; this is put into the rabbet around the centre projection. H H are the packing-plates, made square to conform to and work loosely in the brick-mould, with open square centres of the size of the projections on the plates A and D, and to be put upon these centres on the top or outside of the packing, and are made of one-fourth or three-eighths inch iron, or some wrought metal, and have the set-screws pass down through the top plate, top packing, and top-packing plate, by means of screws upon the packing-bolts, and in the plates, and the lower ends of the packing-screws resting against the bottom packing-plate, so that the tightening of the set-screws tightens both packing-plates at the same time, and thus forces the packing above and below out to fill the mould tight, and retain and pass the oil up and down in the mould, and prevent the mortar or air passing up the sides of the plunger, which is so essential to the forming of perfect brick, and passing them out of the mould without sticking or tearing. I is the oil-chamber, that is formed by means of maintaining the upper and lower packing-plates, and centres around which these packing-plates rest, far enough apart to leave a sufficient space between them to hold the requisite amount of oil that is supplied by means of the oil-hole down through the upper main plate. The oil in this chamber is carried up and down the inside of the mould by the motion of the plunger, thus giving a clean oiled surface for the packing and plunger to work in, and for the brick to be formed in and passed out of in a perfect and uninjured condition, which will allow the bricks to be moulded very fast with safety and correctness, and allows of no escape of oil. J, the cut-off, is formed of a flat post, with right-angled feet reaching the corner bolts on the top of the front end of the plunger, and standing upright and nearly even and plumb with the front end of the plunger, and to pass up and down with the plunger. The top end is turned at right angles and projects from the front of the mould, and a hole is drilled in this turned end that lets the top shank of the cut-off plate pass up through and is fastened in position by a nut above, and one below, by means of which the cut-off plate is set to cut off at will. This shank to the cut-off plate is made flat and wide as it approaches the main plate. The cut-off plate proper is about four and one-fourth inches long, and about two inches wide, near one-fourth of an inch thick, and the lower parts bevelled to an edge. It moves up and down with the motion of the plunger by means of its connection with the upright foot on the top and front end of the plunger, and is confined also close to the front end of the mould in its passage, by means of rabbeted or grooved plates fastened to the front end of the mould, and is adjustable, so as to be set that it may cut off the mud or mortar from escaping just before the brick is finished by the press of the plunger. The lower edge is curved upward, so as to shut off the two outside holes first, and then gradually to close the middle one, so as to just allow the front end of the mould to fill solid, and not allow the brick to be softer and smaller at the end where the mortar escapes, as it otherwise would be if the mortar is allowed to escape during the entire time of forming the brick, and if the mortar is shut off too quick the brick could not be brought down to size without endangering the machinery. From the oil-chamber I there are small openings made down through the bottom plate, to allow sufficient oil to pass down and saturate the covering on the face of the lower plate.

Having described our invention, what we claim as new, and desire to secure by Letters Patent of the United States, is—

The plunger, with projecting centres on their inner faces to receive and support the packing and packing-plates around them, as and for the purpose herein described.

Constructing the plunger of a brick-press with packing and packing-plates and tightening-screws to permit the tightening of the upper and lower packing, packing, and packing-plates at the same time, while they may be held separate from each other and the packing kept tight in the mould above and below, substantially as herein described, and, in combination with the above, covering the face of the plunger with leather, or some similar substance, as and for the purpose set forth.

The plunger of a brick-press, constructed with a suitable reservoir for oil, or other substance, to lubricate the inner surface of the mould, substantially as and for the purpose set forth; and in combination with the above, an opening in or across the plates inside of the mould, to carry and supply the inside of the mould and edges of the packing constantly with oil, so that the brick is kept from sticking to the mould and the packing from wearing, substantially as herein described.

Saturating with oil the leather or other material covering the face of the plunger, by means of ducts passing through the plunger and communicating with the oil-reservoir, substantially as set forth.

The cut-off, which allows all of the surplus mortar to escape from the mould, and stops that escape just in time to secure the mould being uniformly filled, substantially as herein described.

FRANCIS M. FRANKLIN,
O. K. McINTIRE,
WM. WHITELEY.

Witnesses:
REUBEN MILLER,
E. CROSSLAND,
} for FRANCIS FRANKLIN.

J. WARREN KIEFRO,
GEO. SPENCE,
} for O. K. McINTIRE.

WILLIAM H. HAMILTON,
A. E. MARSHALL,
} for WILLIAM WHITELEY.